April 25, 1967  G. HILL  3,315,451
MOWER BLADE
Filed June 5, 1963
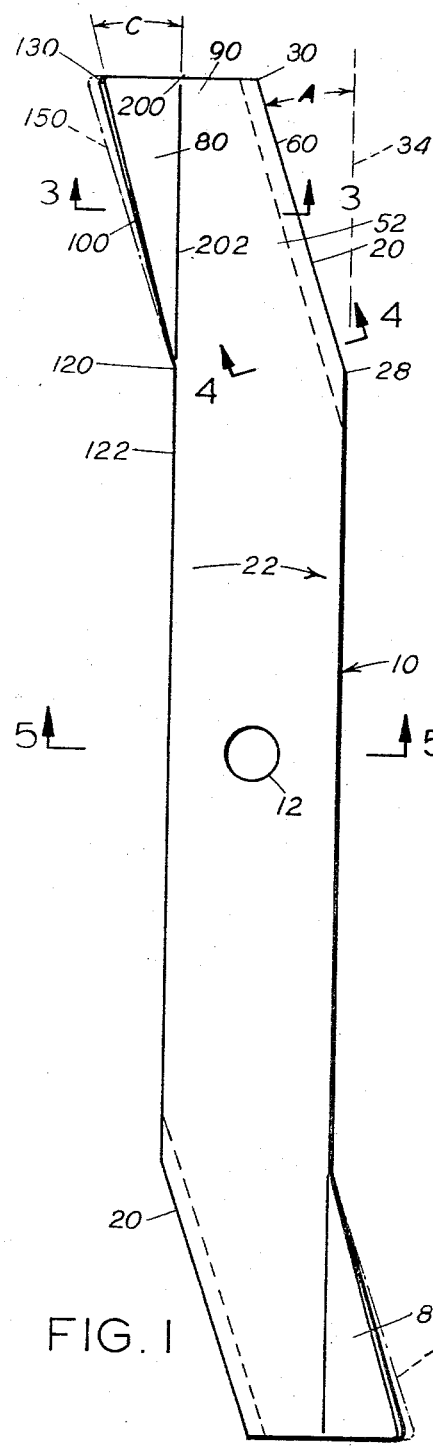
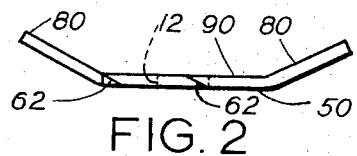
FIG. 2
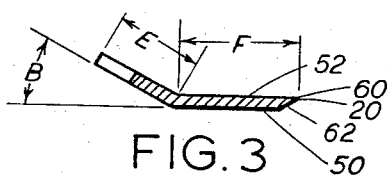
FIG. 3
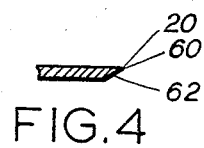
FIG. 4
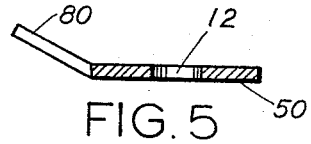
FIG. 5
FIG. 1
INVENTOR.
GILBERT HILL
BY United States Patent Office 3,315,451
Patented Apr. 25, 1967

3,315,451
MOWER BLADE
Gilbert Hill, 3223 Webster St., Omaha, Nebr. 68131
Filed June 5, 1963, Ser. No. 285,836
1 Claim. (Cl. 56—295)

This invention relates to rotary power mower blades and more particularly it is an object of this invention to provide a blade which is particularly adapted to circulate grass centrifugally outward in a higher proportion to its circulating of the grass upward to provide a mower which needs to have wet grass cleaned out less often.

The problem of wet grass clinging to the under side of a mower housing causes considerable work stoppage particularly after rains and during early morning mowing, and it is an object to provide a blade so shaped as to minimize this problem.

Still another object is to provide a blade that has its cutting edges declined from forward inner ends to rearward outer ends whereby said blade will provide excellent cutting at any speed and will also make possible effective cutting at a much lower speed for increasing safety.

Another object is to provide a blade which cuts grass sharply and uniformly.

Still another object is to provide a blade the cutting edge of which is under-ground for riding over rocks, pebbles, and also abrasive dirt which it would strike in such a way as to maintain itself sharp edged longer for less maintenance nuisance and better cutting.

A further object is to provide a blade which cuts, carries, and slings the grass at an ideal timing for preventing clogging of the machine with wet cuttings.

A still further object is to provide a mower blade, the cutting edges of which are each under-ground, this feature being in combination with the provision of fin or air lift flanges on the back side of each blade which latter are of larger than conventional size; whereby the combination of the air lift effect of the fins and the reduction of the air lift effect caused by the under-grinding results in an ideal balance, whereby the blade tends to move grass centrifugally outwardly at an optimum rate in proportion to the rate the grass is lifted; whereby even wet grass tends to be prevented from being thrown upwardly with such a force that it would stick to and clog the under side of the mower housing and is instead delivered outwardly of the grass exhaust port of the mower in a desired fashion; such grass as is thrown against the under side of the housing being sufficiently low in quantity and being thrown at a sufficiently slow speed that it partially dries and falls back off of the housing before it becomes packed in clogging position.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:

FIGURE 1 is a top plan view of the mower blade.

FIGURE 2 is an end view of the blade of FIGURE 1 as seen from the bottom.

FIGURE 3 is a sectional view as seen along the line 3—3 of FIGURE 1.

FIGURE 4 is a sectional view taken along 4—4 of FIGURE 1.

FIGURE 5 is a sectional view taken along 5—5 of FIGURE 1.

The mower blade of this invention which is generally indicated at 10 in FIGURE 1 is designed for horizontal rotation about the center of a bolt opening 12 at its center for receiving a bolt to attach the blade to a drive shaft of a mower.

The blade 10 is elongated and is provided at each end with cutting edges 20 which are disposed on the forward side of the blade inasmuch as the blade is designed to rotate in the direction of an arrow 22.

As seen in top plan view in FIGURE 1 of the cutting edges 20 decline rearwardly from inner ends 28 to outer ends 30, off at an acute angle with respect to the length of the blade, whereby the rearward declination of each cutting edge 20 makes cutting easier.

The angle of declination is indicated at A, which is an angle of preferably 17 degrees, between the forwardmost part of the cutting edge 20 and a line 34 disposed in parallelism with the length of the blade and extending through the inner end 28 of the forwardmost part of the blade.

The majority of the under surface of the blade is horizontal as best seen at 50 in FIGURES 2 and 3.

The blade 10 is undercut at the forward sides of its ends to form the cutting edges 20 and those areas of the blade which are near the cutting edges 20 are provided with a generally horizontal upper surface 52.

The cutting edges 20 when viewed in a cross section taken transversely of the blade are undercut and declined from an upper forward end 60 downwardly and rearwardly to a rearward lower end 62 forming an obtuse angle with respect to the horizontal undersurface 50 of the blade whereby the rearward declination of the underside of the blade between the forward end 60 and rearward end 62 minimizes a dulling of the blade when the blade strikes objects because it is the undercut area of the blade which strikes objects rather than the forwardmost cutting edge 20.

Each outer end of the blade has on its rearward side an up-turned wind directing flnage 80 inclined upwardly and rearwardly from the remainder of the blade as seen in an end view in FIGURE 2.

Each flange 80 defines an angle with respect to the adjacent horizontal upper surface area 90 of the blade which angle is best seen at B in FIGURE 3 and is approximately 27 degrees.

Each flange 80 has a rearward edge 100 which inclines rearwardly and upwardly from a beginning point 120 at the straight rearward edge 122 of the blade to a terminal point 130 at the outer edge of the respective flange 80. That portion of said inclination which is visible in top plan view is indicated by the angle C of FIGURE 3 which is approximately 14 degrees.

The construction of both ends of the blade 10 of FIGURE 1 is the same as regards such terms as the forward side of the blade as is measured by the direction of rotation 22 although it will be seen that the cutting edges 20 and the flanges 80 at the opposite ends of the blade are in opposite sides of the blade from their counter parts respectively.

Construction lines are drawn at 150 at each end of the blade to indicate the outlines of the flanges 80 at times when the flanges 80 are in this same plane with the remainder of the blade and before they are bent upwardly in manufacture. Each line 150 is disposed in parallelism with the respective cutting edge 20.

It is preferred that the width of the blade from the point 28 to the rearward side 22 be a distance F of 1¾ inches and that the maximum width of a wing or wind flange 80 be a distance F of 1¼ inches from its tip 130 to a point 200 on a line 202 projected outwardly from the rearward side of the blade 122. The line 202 in the drawings indicates bend lines also. With these dimensions in operation an ideal air lift effect will be found when the blade is used on a common gasoline mower, to the end that the advantages described in the objects hereof will be achieved.

From the foregoing description, it is thought to be obvious that a mower blade constructed in accordance with my invention is particularly well adapted for use, by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice, except as claimed.

I claim:

A mower blade of the character described comprising a relatively narrow elongated straight central section terminating at each end thereof in similar integral angularly disposed end sections, each of which extends outwardly and is inclined rearwardly from said central section and is provided along the forward edge thereof with an undercut cutting edge; the rearward side of each of said end sections being provided with a wind directing triangular flange which extends upwardly and rearwardly at an acute angle of approximately 27 degrees with respect to the upper surface of said central section; the rear edge of each of said flanges being inclined upwardly and rearwardly at an acute angle of approximately 14 degrees with respect to the vertical rear side edge of said central section.

References Cited by the Examiner

UNITED STATES PATENTS

| | | | |
|---|---|---|---|
| 2,669,084 | 2/1954 | Warren | 56—295 |
| 2,682,142 | 6/1954 | Clark | 56—255 |
| 3,050,925 | 8/1962 | West et al. | 56—295 |
| 3,065,589 | 11/1962 | Summerour | 56—295 |
| 3,093,952 | 6/1963 | Bonser | 56—295 |

ABRAHAM G. STONE, *Primary Examiner.*

T. GRAHAM CRAVER, *Examiner.*

R. R. KINSEY, *Assistant Examiner.*